(12) United States Patent
Hayashi

(10) Patent No.: US 6,392,973 B1
(45) Date of Patent: May 21, 2002

(54) METHOD AND APPARATUS FOR RECORDING DIGITAL DATA BY FORMING PITS ON RECORDING MEDIUM

(75) Inventor: Hideki Hayashi, Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/324,113

(22) Filed: Jun. 2, 1999

(30) Foreign Application Priority Data

Jun. 3, 1998 (JP) .......................................... 10-155067

(51) Int. Cl.$^7$ ................................................ G11B 5/76
(52) U.S. Cl. .................................. 369/59.24; 369/47.17
(58) Field of Search ........................... 369/47.15, 47.17, 369/47.18, 59.23, 59.25, 59.24, 47.28, 53.31, 53.33, 53.34, 275.3

(56) References Cited

U.S. PATENT DOCUMENTS 5,809,004 A * 9/1998 Kobayashi et al. .. 369/275.4 X

* cited by examiner

*Primary Examiner*—Paul W. Huber
(74) *Attorney, Agent, or Firm*—Finnegan, Henderson, Farabow, Garrett & Dunner, L.L.P.

(57) ABSTRACT

A method of recording a digital signal representing digital data onto a recording medium by changing a position of each edge of each of a plurality of pits in accordance with the digital signal is provided. The method has the processes of: receiving a digital signal to be recorded; generating a predicted inter-symbol interference signal by predicting inter-symbol interference contained in a reproduced signal from the recording medium when a reproducing process is carried out with respect to the recording medium by a reproducing apparatus, on the basis of predetermined characteristics of a recording process in a recording apparatus, predetermined characteristics of the reproducing process, and the received digital signal; generating a compensated digital signal by subtracting the predicted inter-symbol interference signal from the received digital signal; and recording the compensated digital signal onto the recording medium by continuously changing the position of each edge of each of the plurality of pits in proportion to the compensated digital signal.

9 Claims, 13 Drawing Sheets

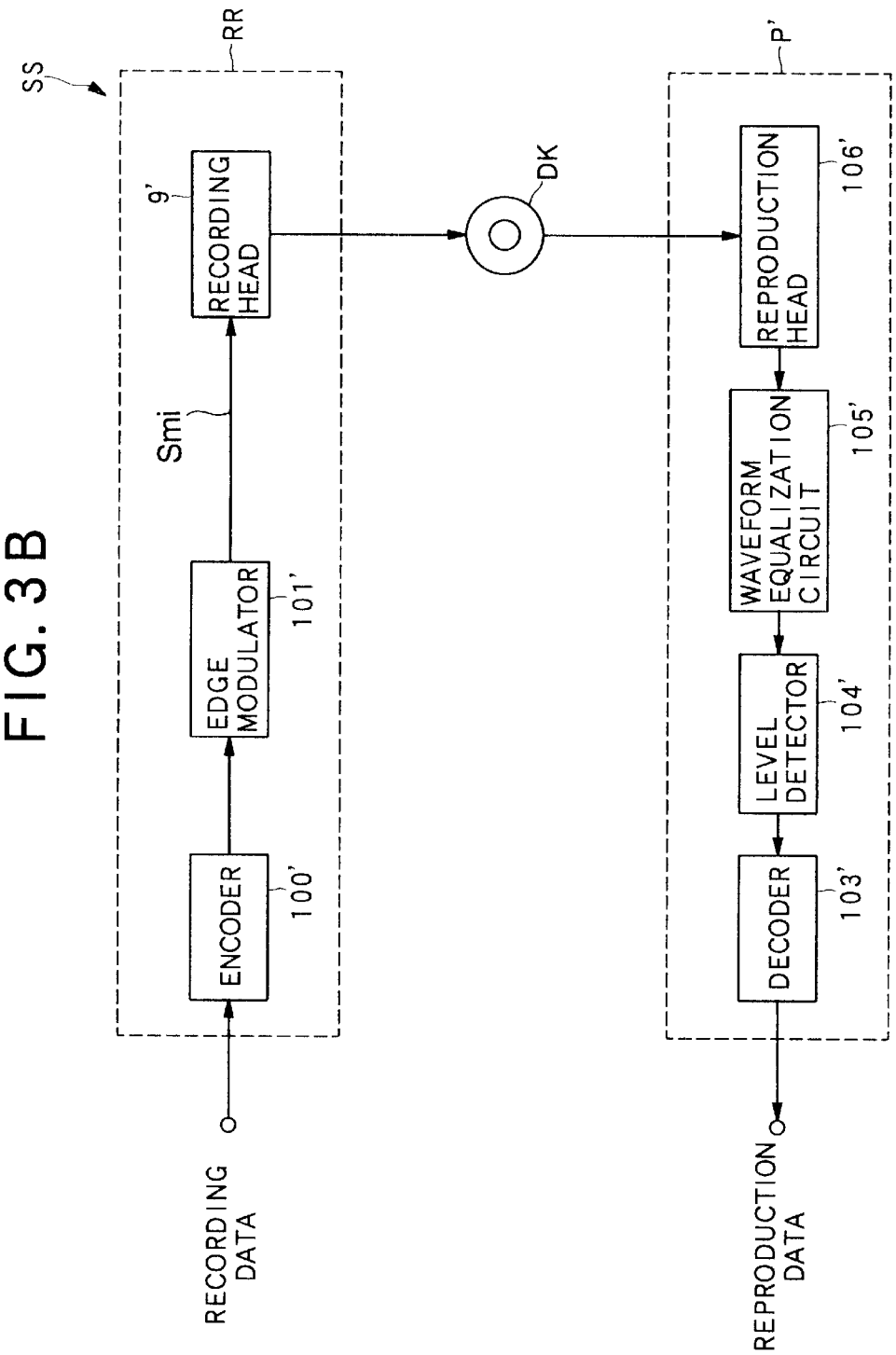

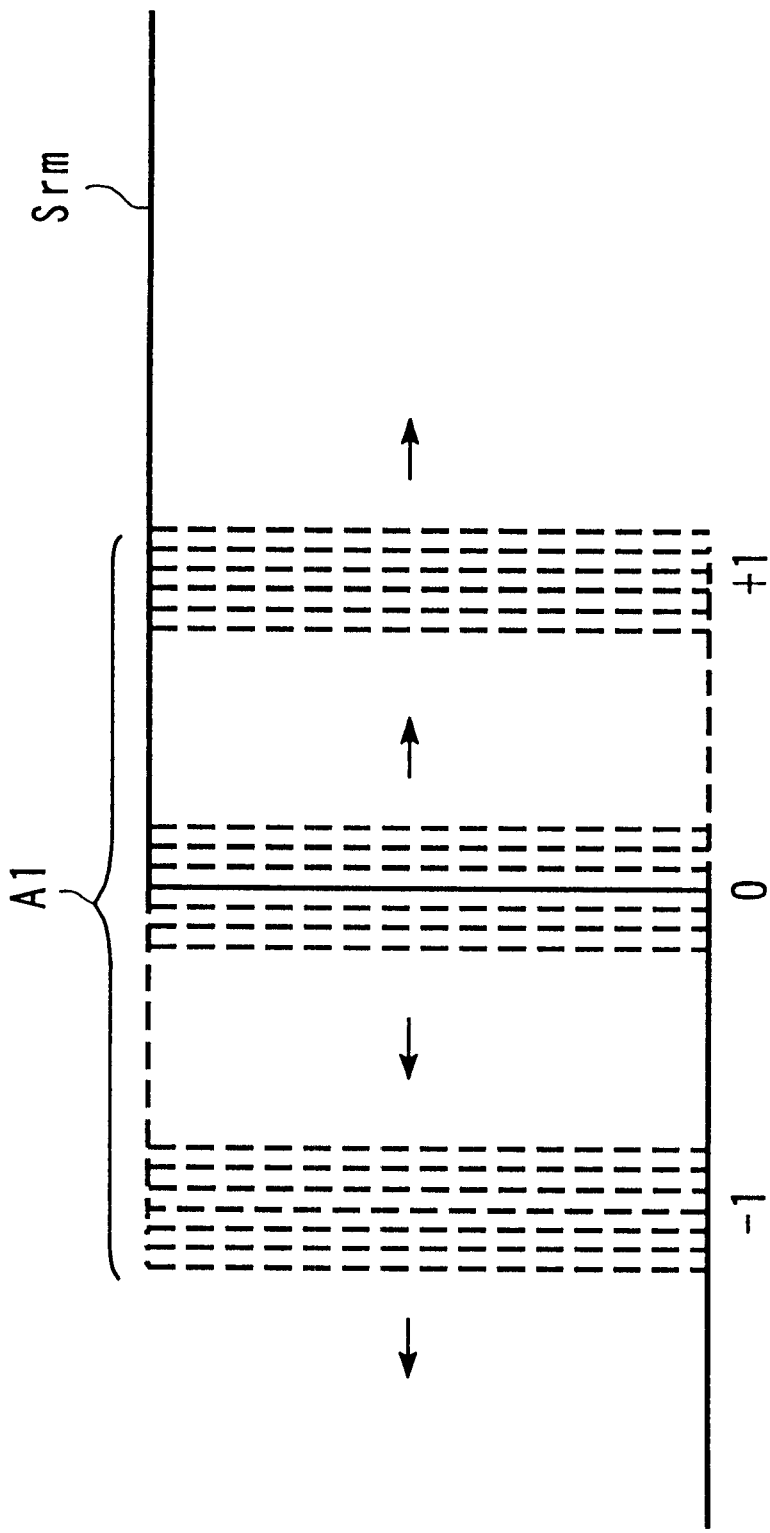

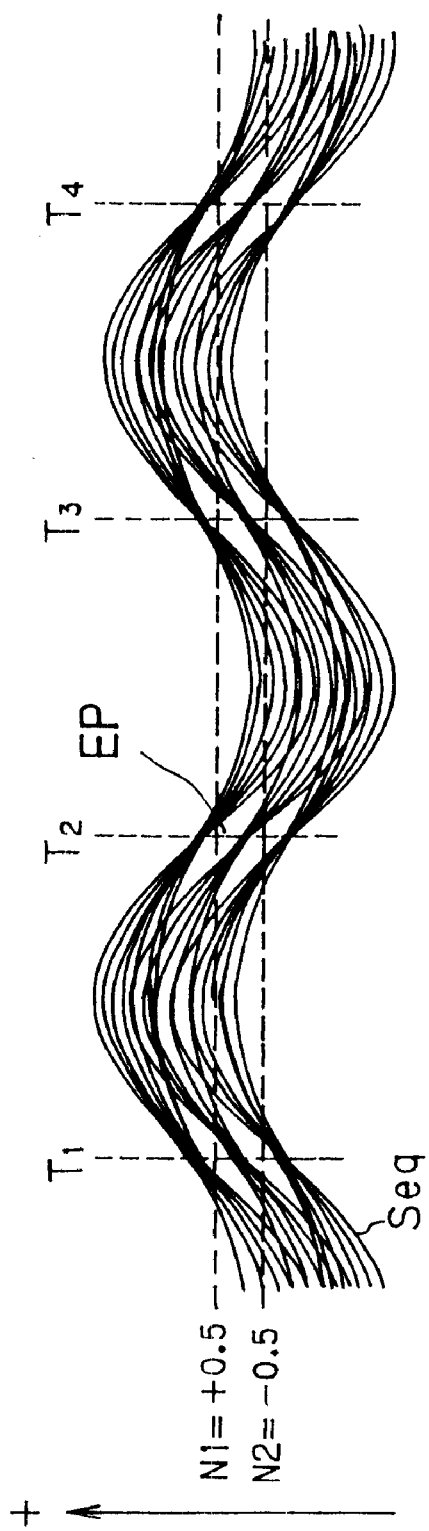

METHOD AND APPARATUS FOR RECORDING DIGITAL DATA BY FORMING PITS ON RECORDING MEDIUM

BACKGROUND OF THE INVENTION

1. Field of the Invention

The present invention relates to an information recording method and an information recording apparatus for recording digital data in high density by forming pits on a recording medium such as an optical disk or the like.

2. Description of the Related Art

In general, digital data (digital signal) is recorded as pits on a recording medium such as an optical disk or the like. According to a conventional optical disk such as a CD or the like, there has been employed a method for recording digital data on the optical disk by changing the length of pits or the distance between pits based on the digital data.

In order to increase the recording density of digital data, there has recently been proposed a recording method different from the above-described recording method. This recording method is called a Single Carrier Independent Pit Edge Recording (SCIPER) system.

FIG. 1 shows a relationship between pits and digital data according to the SCIPER system. As shown in FIG. 1, in the SCIPER system, pits PT are disposed on a track of an optical disk with a predetermined period T between the pits, regardless of the contents of digital data. The contents of the digital data are represented at each position of edges E1 and E2 of each pit PT. In other words, for each pit PT, the front edge E1 positioned at the front side of a peripheral direction of the optical disk is determined by the contents of a certain digital data. The rear edge E2 positioned at the rear side of the peripheral direction of the optical disk is determined based on the contents of another digital data. As explained above, according to the SCIPER system, the recording of the digital data is achieved by stepwise shifting the positions of the edges E1 and E2 of each PT based on the digital data.

In the case of using a digital data having three values of "−1", "0" and "1", for example, the position of the front edge E1 of a pit PT shifts stepwise in three stages as shown in FIG. 1. For example, when the digital data is "1", the position of the front edge E1 is P1. When the digital data is "0", the position of the front edge E1 is P2. When the digital data is "−1", the position of the front edge E1 is P3.

The position of the rear edge E2 of the pit PT also shifts stepwise in three stages in a similar manner. For example, when the digital data is "−1", the position of the rear edge E2 is P4. When the digital data is "0", the position of the rear edge E2 is P5, and when the digital data is "1", the position of the rear edge E2 is P6.

In the case of reproducing the digital data recorded by the SCIPER system, shown in FIG. 1, a light spot SP is formed by irradiating a laser beam onto the optical disk, and the pit PT is traced with this light spot SP. A reflection beam of this light spot is converted into a detection signal. In this detection signal, differences of the position of each of the edge E1 and edge E2 are represented as changes in the level. Accordingly, by comparing the changes of the level of this detection signal with a predetermined reference level, it is possible to decide the contents of the digital data, that is, "−1", "0" or "1".

However, at the time of reproducing the recording data recorded by the SCIPER system, components due to inter-symbol interference are superimposed in the detection signal. Therefore, it is not easy to accurately decide the contents of the digital data.

Further, when the signal to noise ratio (S/N ratio) of a reproducing apparatus is low, what is called system noise is superimposed in the detection signal, in addition to the components due to the inter-symbol interference. This makes it further difficult to make an accurate decision of the contents of the digital data.

If what is called media noise of the optical disk is further superimposed in the detection signal in addition to the above, it becomes much more difficult to make an accurate decision of the contents of the digital data.

SUMMARY OF THE INVENTION

It is therefore an object of the present invention to provide an information recording method and an information recording apparatus capable of achieving an accurate reproduction of data recorded by the SCIPER system, by eliminating the inter-symbol interference.

The above-stated object can be achieved by the method in accordance with the present invention. This method is an information recording method of recording a digital signal representing digital data onto a recording medium by changing a position of each edge of each of a plurality of pits in accordance with the digital signal. The method is used in a recording and reproducing system comprising a recording apparatus for recording the digital signal onto the recording medium by changing the position of each edge of each of the plurality of pits in accordance with the digital signal, and a reproducing apparatus for reproducing the digital signal recorded on the recording medium. The method has the processes of: receiving the digital signal to be recorded; generating a predicted inter-symbol interference signal by predicting inter-symbol interference contained in a reproduced signal from the recording medium when a reproducing process is carried out with respect to the recording medium by the reproducing apparatus, on the basis of predetermined characteristics of a recording process in the recording apparatus, predetermined characteristics of the reproducing process, and the received digital signal; generating a compensated digital signal by subtracting the predicted inter-symbol interference signal from the received digital signal; and recording the compensated digital signal onto the recording medium by continuously changing the position of each edge of each of the plurality of pits in proportion to the compensated digital signal.

The digital signal representing the digital data is recorded onto the recording medium by the recording apparatus. This digital signal is then reproduced from the recording medium. At this time, this reproduced signal contains inter-symbol interference. This inter-symbol interference is produced by influence of characteristics of the recording process of the recording apparatus, characteristics of the reproducing process of the reproducing apparatus, and the digital signal. Therefore, the inter-symbol interference can be predicted on the basis of the characteristics of the recording process of the recording apparatus, characteristics of the reproducing process of the reproducing apparatus and the digital signal, and a replica of the inter-symbol interference can be created as a signal. If this replica signal is subtracted from the digital signal before the digital signal is actually recorded onto the recording medium, it is possible to cancel the inter-symbol interference in the reproduced signal at the time of reproduction.

In the method according to the present invention, a predicted inter-symbol interference signal is firstly generated on the basis of predetermined characteristics of the recording process in the recording apparatus, predetermined characteristics of the reproducing process in the reproducing apparatus and the received digital signal. A compensated digital signal is next generated by subtracting the predicted inter-symbol interference signal from the received digital signal. This compensated digital signal is then recorded onto the recording medium.

To record the compensated digital signal, a plurality of pits corresponding to the compensated digital signal are formed on the recording medium. As a result of this, the position of each edge of each pit is continuously changed in proportion to the compensated digital signal. As stated above, the compensated digital signal is generated by subtracting the predicted inter-symbol interference signal from the digital signal. Since the level of the inter-symbol interference signal is continuously changed with a continuous change of the amount of the inter-symbol interference contained in the reproduced signal, the compensated digital signal is also continuously changed. Therefore, the position of each edge of each pit is also continuously changed in proportion to the continuous change of the compensated digital signal.

After the compensated digital signal was recorded onto the recording medium in such a recording process, this compensated digital signal is reproduced from the recording medium by the reproducing apparatus. In the reproducing process of the reproducing apparatus, the inter-symbol interference is superimposed on the reproduced digital signal. However, this inter-symbol interference does not appear in the reproduced digital signal, because the inter-symbol interference is cancelled by the predicted inter-symbol interference signal that has been subtracted from the digital signal in the stage of recording.

Thus, according to the method in accordance with the present invention, the inter-symbol interference can be eliminated. Therefore, the digital signal recorded on the recording medium can be accurately reproduced by the reproducing apparatus.

The above-stated object can be also achieved by a recording apparatus in accordance with the present invention. This recording apparatus is an apparatus for recording digital signal representing digital data onto a recording medium by changing a position of each edge of each of a plurality of pits in accordance with the digital signal. The recording apparatus is used in a recording and reproducing system together with a reproducing apparatus for reproducing the digital signal recorded on the recording medium from the recording medium. The recording apparatus includes: a receiving device for receiving the digital signal to be recorded; a predicting device for generating a predicted inter-symbol interference signal by predicting inter-symbol interference contained in a reproduced signal from the recording medium when a reproducing process is carried out with respect to the recording medium by the reproducing apparatus, on the basis of predetermined characteristics of a recording process in the recording apparatus, predetermined characteristics of the reproducing process, and the received digital signal; a compensating device for generating a compensated digital signal by subtracting the predicted inter-symbol interference signal from the received digital signal; and a recording device for recording the compensated digital signal onto the recording medium by continuously changing the position of each edge of each of the plurality of pits in proportion to the compensated digital signal.

According to this apparatus, the inter-symbol interference can be eliminated when the digital signal is reproduced from the recording medium by the reproducing apparatus. Therefore, the digital signal can be accurately reproduced.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 3B is a block diagram for showing a virtual system to be used for setting filter characteristics of a digital filter in the first embodiment;

FIG. 4B is an enlarged diagram of a rising portion of the edge modulation signal in FIG. 4A;

FIG. 4C is a diagram for showing an analog reproduction signal in the information recording apparatus;

DETAILED DESCRIPTION OF THE PREFERRED EMBODIMENTS

Embodiments of the present invention will now be described with reference to the drawings. In the following description to be made, the present invention is applied to an information recording apparatus for recording digital data on an optical disk by the SCIPER system.

At first, a first embodiment of the present invention will be described with reference to FIGS. 2 to 6.

Figure 1:
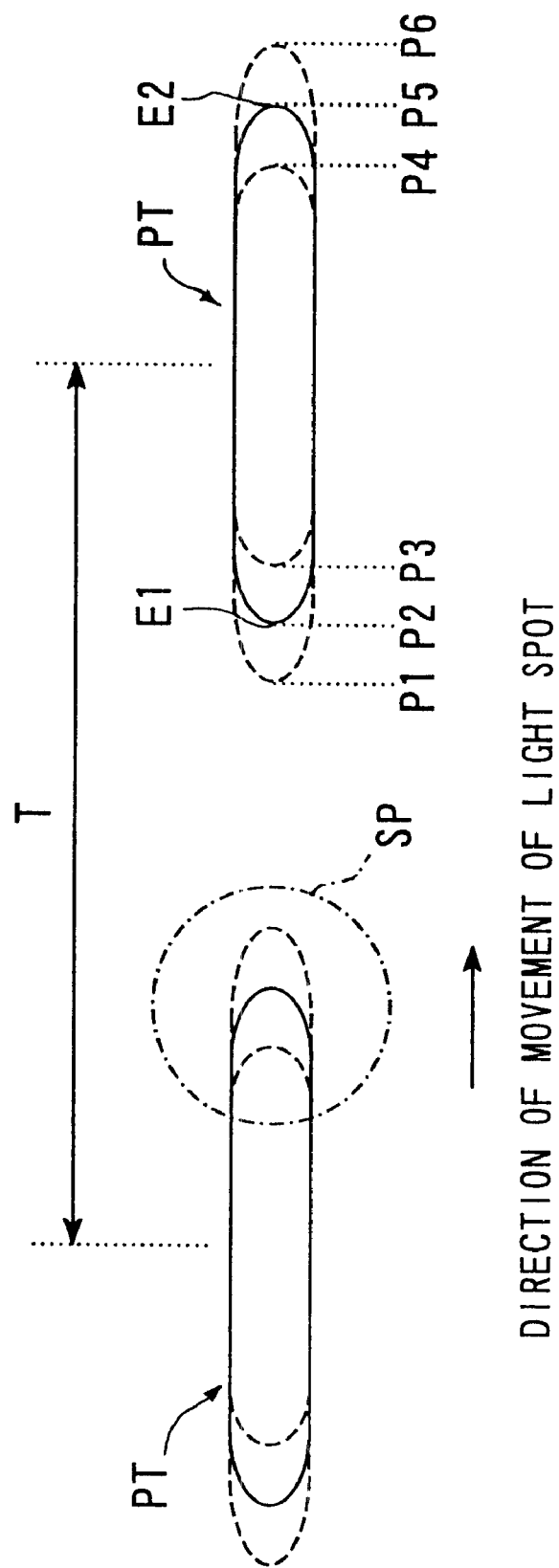
FIG. 1 is a diagram for showing a relationship between pits and digital data recorded by the SCIPER system.
Figure 2:
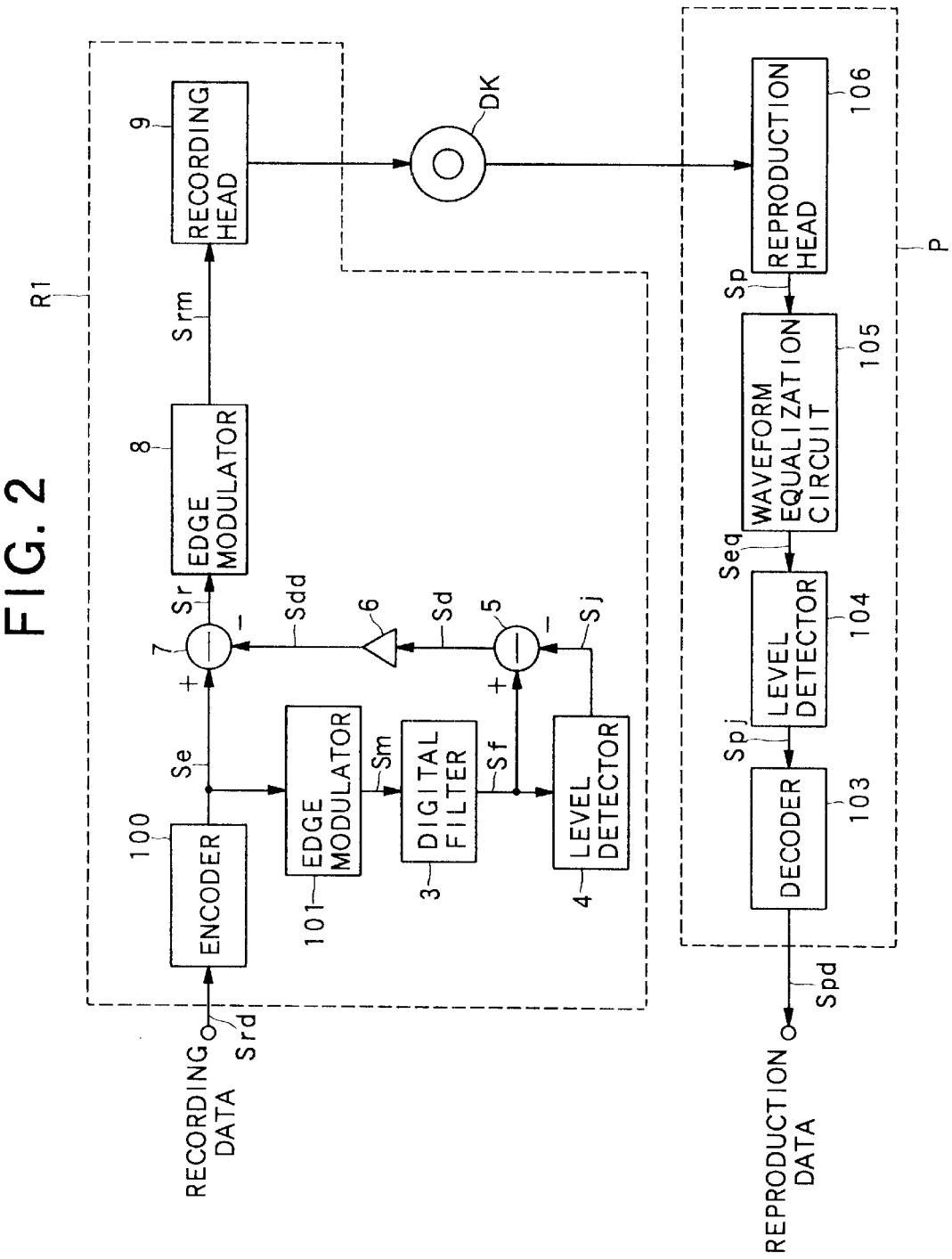
FIG. 2 is a block diagram for showing an information recording apparatus and an information reproducing apparatus according to a first embodiment of the present invention.
Figure 3A:
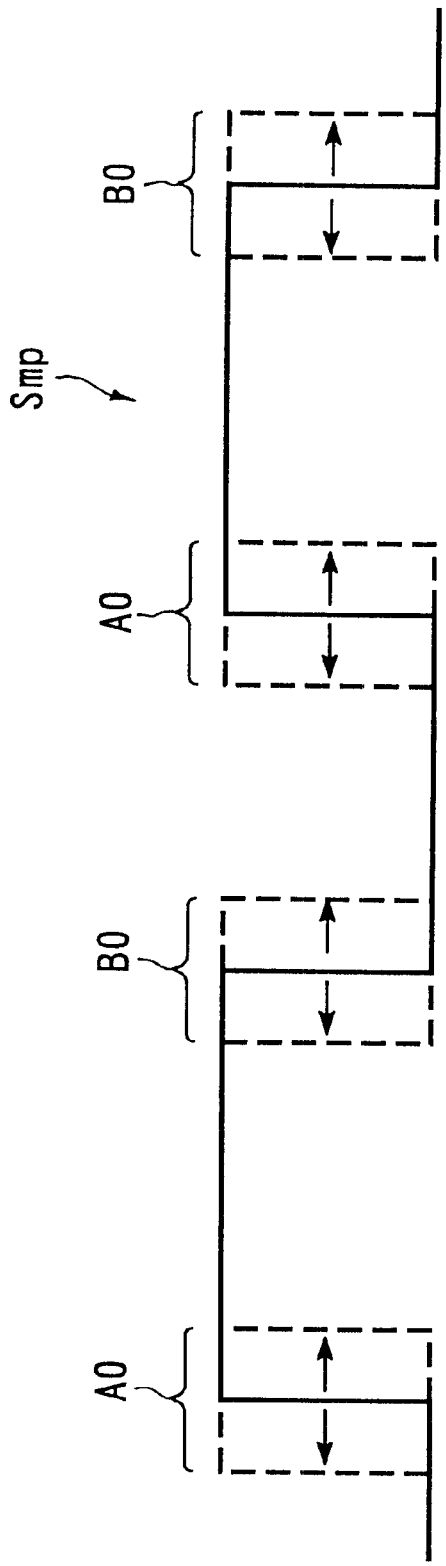
FIG. 3A is a diagram for showing an initial waveform of an edge modulation signal Sm according to the first embodiment.
Figure 3C:
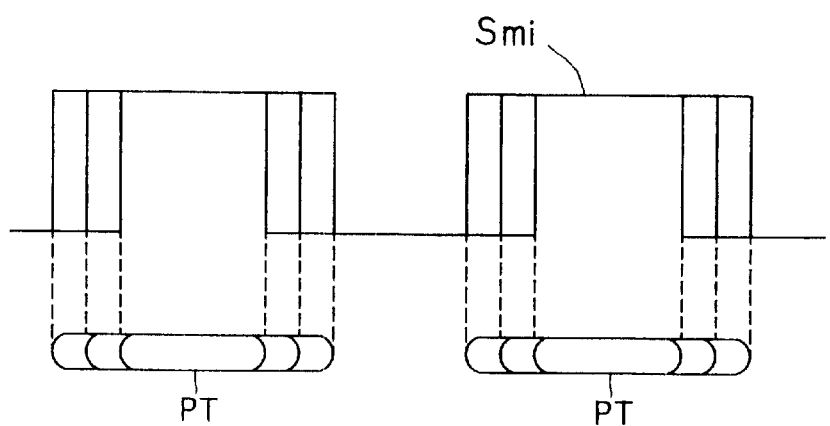
FIG. 3C is a diagram for showing a relationship between a virtual edge modulation signal and pits in the virtual system.
Figure 3D:
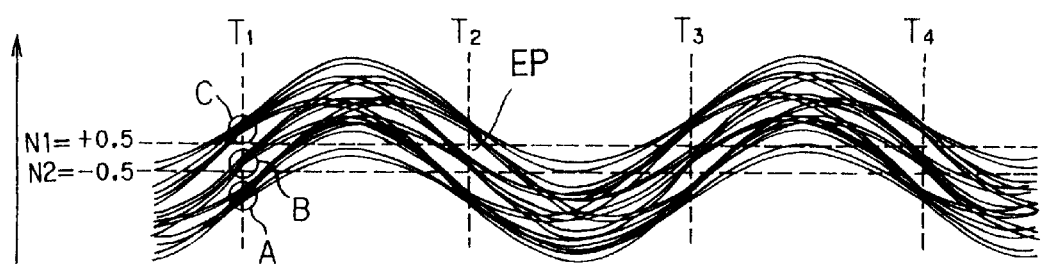
FIG. 3D is a waveform diagram of a signal output from a waveform equalization circuit of the virtual system.
Figure 4A:
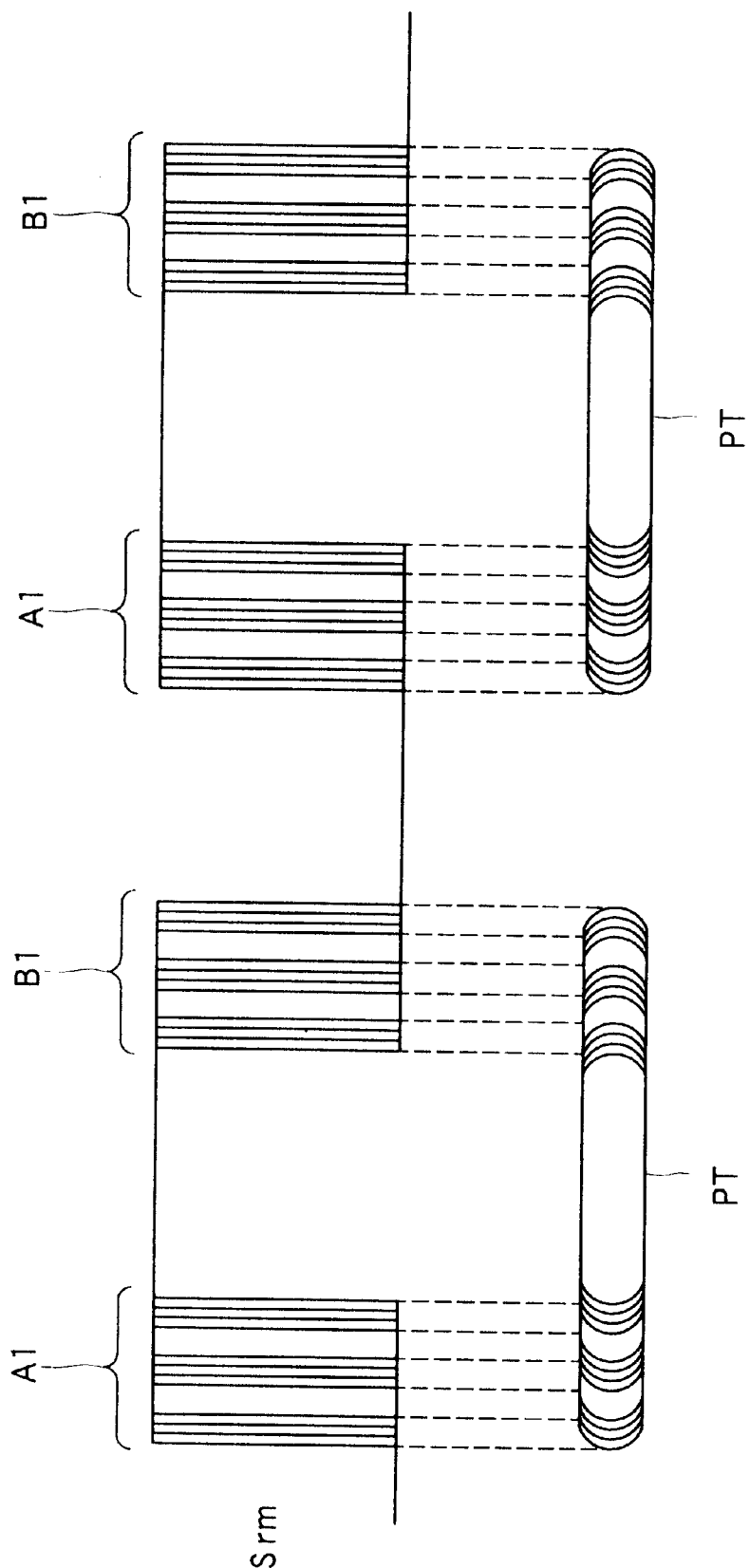
FIG. 4A is a diagram for showing a relationship between an edge modulation signal and pits in an information recording apparatus.
Figure 5:
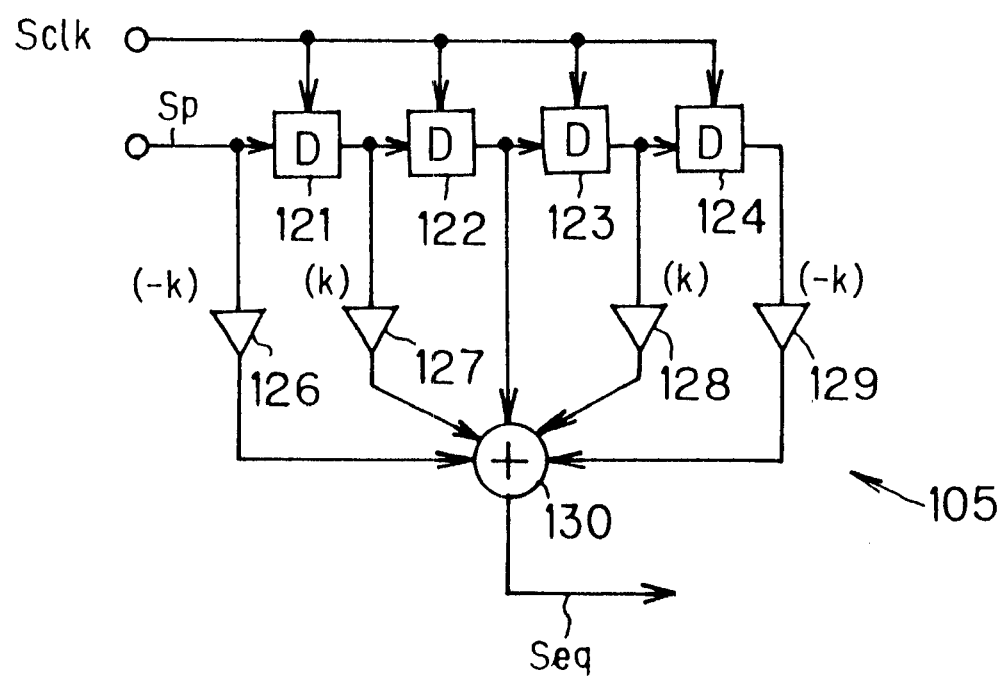
FIG. 5 is a block diagram for showing the waveform equalization circuit.
Figure 6:
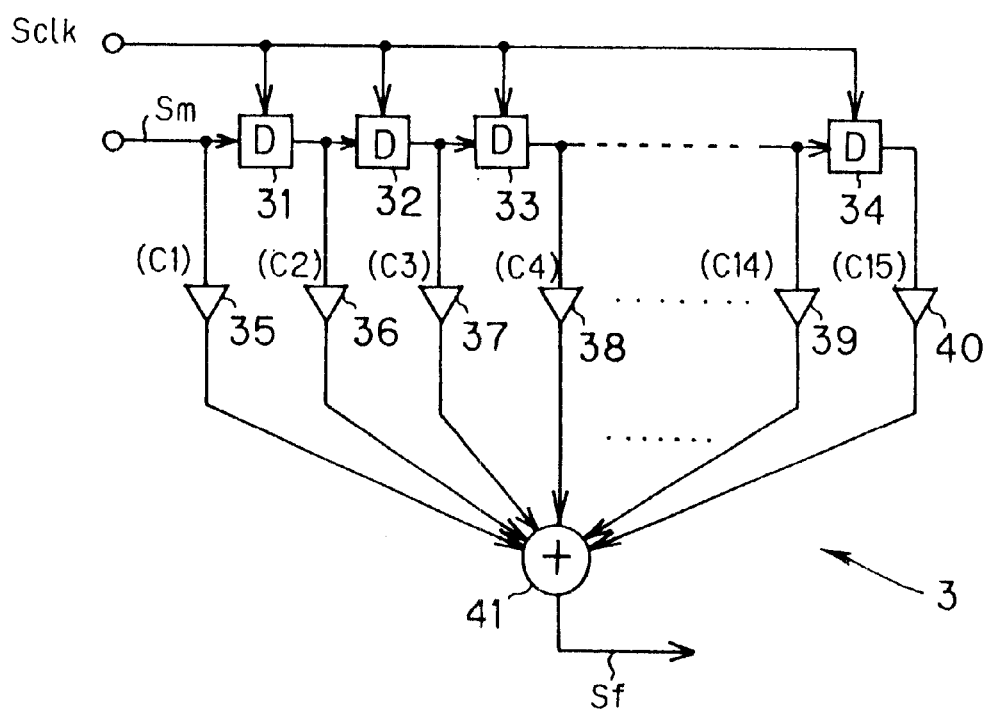
FIG. 6 is a block diagram for showing the digital filter.

FIG. 2 is a block diagram for showing a schematic configuration of an information recording apparatus and an information reproducing apparatus according to the first embodiment, FIG. 3A is a diagram for showing an initial waveform of an edge modulation signal Sm according to the first embodiment, and FIG. 3B is a block diagram for showing a virtual system to be used for setting filter characteristics of a digital filter 3 in the first embodiment. FIG. 3C is a diagram for showing a relationship between a virtual edge modulation signal and pits in the virtual system, and FIG. 3D is a waveform diagram of a signal output from a waveform equalization circuit of the virtual system. FIG. 4A is a diagram for showing a relationship between an edge modulation signal and pit shapes in the SCIPER system of the first embodiment, FIG. 4B is an enlarged diagram of a rising portion of the edge modulation signal in FIG. 4A, and FIG. 4C is a diagram for showing the waveform of an analog reproduction signal obtained from the information recording apparatus of the first embodiment from an optical disk having pits. FIG. 5 is a block diagram for showing a schematic configuration of the waveform equalization circuit in the first embodiment, and FIG. 6 is a block diagram for showing a schematic configuration of the digital filter relating to the first embodiment.

Further, in the following description, explanation will be made of an example of the SCIPER system for the case where each of the position of forming the front edge and the position of forming the rear edge of a pit is caused to correspond to a recording symbol of any one of three-value levels of "−1", "0" and "1".

It is also assumed that input and output characteristics are linear in the information recording apparatus and the information reproducing apparatus of the first embodiment.

As shown in FIG. 2, an information recording apparatus R1 relating to the first embodiment has an encoder 100, edge modulators 101 and 8, a digital filter 3, a level detector 4, subtraction circuits 5 and 7, a coefficient circuit 6, and a recording head 9.

An information reproducing apparatus P relating to the first embodiment has a reproduction head 106, a waveform equalization circuit 105, a level detector 104, and a decoder 103.

The operation will be explained next.

The information recording apparatus R1 receives recording data Srd supplied from an external source which is not illustrated or a internal device installed in the information recording apparatus R1 which is not illustrated.

The encoder 100 partitions recording data Srd to be recorded into every three bits, converts each of the partitioned recording data Srd into two recording symbols Se each having three-value levels, and outputs the results to the edge modulator 101 and the subtraction circuit 7. In this case, each recording symbol Se has a discrete integer value, that is, "−1", "0" or "+1", in this example.

In the conversion into the recording symbol, the three-bit recording data is converted while it is caused to correspond to the two recording symbols having a three-value level of "−1", "0" or "1", as shown in the following table. In this case, as the three-bit recording data takes eight combinations of values of $2^3=8$ and the two recording symbols takes nine combinations of values of $3^2=9$, it is possible to convert the recording data so as to correspond to the recording symbol at one to one.

The following table shows one example of conversion, and it is also possible to have other one-to-one corresponding conversion.

TABLE 1

| RECORDING DATA Srd | | RECORDING |
|---|---|---|
| DECIMAL | BINARY | SYMBOLS Se |
| 0 | 000 | −1, −1 |
| 1 | 001 | −1, 0 |
| 2 | 010 | −1, 1 |
| 3 | 011 | 0, −1 |

TABLE 1-continued

| RECORDING DATA Srd | | RECORDING |
|---|---|---|
| DECIMAL | BINARY | SYMBOLS Se |
| 4 | 100 | 0, 1 |
| 5 | 101 | 1, −1 |
| 6 | 110 | 1, 0 |
| 7 | 111 | 1, 1 |

The edge modulator 101 generates an edge modulation signal Sm by timely shifting forward or backward a rising timing A0 and a falling timing B0 of a pre-generated rectangular wave signal Smp to make these timings correspond to each recording symbol Se, based on the recording symbol Se, as shown in FIG. 3A.

The digital filter 3 filters the edge modulation signal Sm and generates a duplicate data Sf.

The duplicate data Sf is a signal of a likely reproduction signal that would be obtained from a waveform equalization circuit 105' when the recording data is assumed to be recorded and reproduced by a virtual system SS shown in FIG. 3B. The virtual system shown in FIG. 3B includes a recording apparatus RR, an optical disk DK and a reproducing apparatus P'. The recording apparatus RR has an encoder 100', an edge modulator 101' and a recording head 9'. The encoder 100', the edge modulator 101' and the recording head 9' are substantially the same circuits as the encoder 100, the edge modulator 101 and the recording head 9 respectively of the information recording apparatus R1 (FIG. 2) in the first embodiment of the present invention. The reproducing apparatus P' is substantially the same apparatus as the reproducing apparatus P in the first embodiment of the invention to be described later.

In the recording apparatus RR of the virtual system SS, recording data is converted into a virtual edge modulation signal Smi by the encoder 100' and the edge modulator 101'. This virtual edge modulation signal Smi is substantially the same signal as the above-described edge modulation signal Sm. Then, this virtual edge modulation signal Smi is recorded as a pit PT on the optical disk DK by the recording head 9'. In this case, the virtual edge modulation signal Sm and the pit PT have a relationship as shown in FIG. 3C.

The recording data recorded onto the optical disk DK by the recording apparatus RR is read by a reproduction head 106' of the reproducing apparatus P' and is input to a waveform equalization circuit 105'. The waveform equalization circuit 105' is a filter for compensating for high frequency component attenuation characteristics of a signal read by the reproduction head 106', and has a structure similar to that of the waveform equalization circuit 105 to be described later. In other words, the waveform equalization circuit 105' carries out a filtering for emphasizing the high frequency component of the signal read out by the reproduction head 106'. As a result, the signal output from the waveform equalization circuit 105' becomes a signal as shown in FIG. 3D. This signal includes inter-symbol interference superimposed by the recording processing of the recording apparatus RR and the reproduction processing of the reproducing apparatus P'. FIG. 3D shows in superposition all of a large number of potential signals to be output from the waveform equalization circuit 105'.

Referring back to FIG. 2, the digital filter 3 in the first embodiment of the present invention reproduces a signal output from the waveform equalization circuit 105', based on the edge modulation signal Sm output from the edge modulation circuit 101. This can be realized, for example, by structuring the digital filter 3 with a digital filter according to a Finite Impulse Response (FIR) system and by properly setting filter characteristics of the digital filter. For example, a signal output from the waveform equalization circuit 105' of the virtual system SS can be reproduced by setting filter characteristics using an overall frequency transfer function of the recording apparatus RR and the reproducing apparatus P' of the virtual system SS. Further, this frequency transfer function can be approximately expressed by using a function obtained by multiplying Modulation Transfer Function (MTF) characteristics of the optical system of the reproducing apparatus P' by the frequency characteristics of the waveform equalization circuit 105'.

Further, in place of the method of using the above functions, it may also be arranged such that, at first the virtual system SS is actually prepared, then the recording data is recorded and reproduced by using the virtual system SS actually prepared, to thereby obtain data, and the filter characteristics of the digital filter 3 is set based on this data obtained. The filter characteristics of the digital filter 3 can also be set by calculation using other optical theory.

The digital filter 3 outputs the reproduced signal as a duplicate data Sf to the level detector 4 and to one input terminal of the subtraction circuit 5.

The level detector 4 compares the level of the duplicate data Sf output from the digital filter 3 with predetermined threshold values, generates a decision data Sj and outputs this data to the other input terminal of the subtraction circuit 5.

More specifically, the level detector 4 holds the duplicate data Sf as a sample at a timing of a symbol $T_1$, $T_2$, $T_3$ or $T_4$ shown in FIG. 3D, and compares this hold value with a threshold value N1 and a threshold value N2 respectively. For example, the threshold value N1 is "+0.5" and the threshold value N2 is "−0.5". When the hold value is smaller than the threshold value N2, the value of the duplicate data Sf in this case is decided as "−1". When the hold value is not smaller than the threshold value N2 and is not larger than the threshold value N1, the value of the duplicate data Sf in this case is decided as "0". When the hold value is larger than the threshold value N1, the value of the duplicate data Sf in this case is decided as "+1". Then, the level detector 4 outputs a signal indicating a result of this decision as a decision data Sj to the other input terminal of the subtraction circuit 5.

The subtraction circuit 5 subtracts the level of the decision data Sj generated by the level detector 4 from the level of the duplicate data Sf generated by the digital filter 3, and outputs a resultant data obtained as an interference data Sd to the coefficient circuit 6. This interference data Sd is the data corresponding to the inter-symbol interference superimposed by the processes in the recording apparatus PR and the reproducing apparatus P' of the virtual system SS. This means that the data corresponding to the inter-symbol interference component is extracted from the duplicate data Sf by the subtraction circuit 5.

The coefficient circuit 6 multiplies the interference data Sd by a predetermined coefficient to generate a compensation data Sdd, and outputs this compensation data to the subtraction circuit 7. The predetermined coefficient to be multiplied to the interference data Sd by the coefficient circuit 6 is normally a value not larger than 1 and is calculated in advance by experiments or the like and set so as to be able to obtain a maximum effect to eliminate inter-symbol interference.

The subtraction circuit 7 subtracts the level of the compensation data Sdd from the level of the recording symbol Se, and outputs a compensation recording symbol Sr.

In this case, as the duplicate data Sf output from the digital filter 3 takes continuous real number digital values, the interference data Sd and the compensation recording symbol Sr similarly take continuous real number digital values. In other words, the compensation recording symbol Sr is not limited to "1", "0" and "−1", and can take a numerical value finer than "1", "0" and "−1", such as, for example, a numerical value of "0.9", "−0.9", "−1.1" or "1.1".

An edge modulator 8 timely shifts forward or backward a rising timing and a falling timing of a rectangular wave signal generated in advance corresponding to the compensation recording symbol Sr so that these timings correspond to each compensation recording symbol Sr, and generates an edge modulation signal Srm.

FIG. 4A shows an example of this edge modulation signal Srm. FIG. 4B shows in enlargement a rising portion A1 of the edge signal Srm in FIG. 4A. It is known from FIG. 4B that the rising portion A1 of the edge signal Srm shifts in a smaller shift quantity than the shift quantity corresponding to "1", "0" and "−1".

The recording head 9 turns on/off a recording laser beam in response to the edge modulation signal Srm, to form the pits PT shown in FIG. 4A on the track of the optical disk DK.

Thus, the optical disk DK wherein the position of each edge of each pit PT is continuously changed in proportion to the edge modulation signal Srm (the compensation recording symbol Sr) is produced.

The method of reproducing the recording data Srd recorded with the pit PT formed in the above-described manner will be explained next. It is assumed that, in the information reproducing apparatus P of the first embodiment, one light spot SP irradiates only one edge at one time.

At first, the reproduction head 106 radiates a reproduction laser beam to the string of pits recorded on the optical disk DK, generates an analog reproduction signal Sp according to a reflection light quantity of the laser beam, and outputs this signal to the waveform equalization circuit 105.

Then, in order to compensate for the high frequency component attenuation characteristics of the information reproducing apparatus P, the waveform equalization circuit 105 filters the analog reproduction signal Sp with a filter having high frequency component highlighting characteristics, generates an analog reproduction signal Seq (or read signal), and outputs this signal to the level detector 104.

FIG. 4C shows a waveform of the analog reproduction signal Seq after the waveform equalization. FIG. 4C shows in superposition all of a large number of potential signals to be output as the analog reproduction signal Seq.

In this case, what is called an eye pattern EP appears at a slope portion of the waveform of the analog reproduction signal Seq shown in FIG. 4C.

Further, as is apparent from FIG. 4C, as each eye pattern EP in the waveform of the analog reproduction signal Seq is opened larger than an eye pattern in the waveform shown in FIG. 3D, it becomes possible to decide a level more accurately in the level detector 104.

In other words, at each of the sample hold timings $T_1$ to $T_4$, an interval or space between the waveforms of the analog reproduction signal Seq shown in FIG. 4C is open more clearly than an interval between the waveforms of the signal including the inter-symbol interference shown in FIG. 3D. Therefore, it is possible to decide a level accurately in the level detector 104.

The reason why the space between the values of the analog reproduction signal Seq becomes larger is that as the compensation data Sdd for showing the inter-symbol interference has been subtracted in advance in the subtraction circuit 7 within the information recording apparatus R1, a superimposition of the inter-symbol interference can be cancelled.

Thereafter, the level detector 104 carries out a processing similar to the above-described processing carried out by the level detector 4. Namely, the level detector 104 compares the level of the waveform equalized analog reproduction signal Seq with predetermined threshold values (two threshold values having values of "−0.5" and "+0.5" respectively), to thereby generate a reproduction symbol Spj corresponding to the recording symbol Se.

Next, the decoder 103 converts two of the reproduction symbols Spj each consisting of the data "−1", "0" and "1" into three binary data each consisting of "0" and "1". The decoder 103 carries out a conversion opposite to the above-described conversion carried out by the encoder 100. As a result, a reproduction data is generated.

The operation of the information recording apparatus R1 and the information reproducing apparatus P will be explained next based on an example of detailed numerical values.

Suppose it has been detected in advance to add an inter-symbol interference of level 0.1 to the recording symbol Se of "+1".

In other words, it is assumed that the level of the duplicate data Sf corresponding to the "+1" recording symbol Se is as follows:

(Level of Duplicate Data *Sf*)=(Level of Recording Symbol *Se*)+
(Level of Inter-Symbol Interference)=1+0.1=1.1

Next, when the level of the duplicate data Sf is smaller than −0.5, the value of the decision data Sj is "−1", and when the level of the duplicate data Sf is not smaller than −0.5 and not larger than 0.5, the value of the decision data SJ is "0". When the level of the duplicate data Sf is larger than 0.5, the value of the decision data Sj is "+1". Therefore, the value of the decision data Sj becomes "+1" in this case.

Accordingly, the level of the interference data Sd for simulating the inter-symbol interference becomes as follows:

(Level of Interference Data *Sd*)=(Level of Duplicate Data *Sf*)−
(Level of Decision Data *Sj*)=1.1−1=0.1

As a result, the level of the compensation data Sdd becomes as follows:

(Level of Compensation Data *Sdd*)=(Level of Interference Data
*Sd*)×(Multiplier of Coefficient Circuit 6)=0.1×1=0.1

In this case, it is assumed that the multiplier or coefficient of the coefficient circuit 6 is "1".

Then, the level of the compensation recording symbol Sr becomes as follows:

(Level of Compensation Recording Symbol *Sr*)=(Level of Recording Symbol *Se*)−(Level of Compensation Data *Sdd*)=1−0.1=0.9

As a result, there is formed on the optical disk DK a pit PT (FIG. 4A) of which edge has shifted by the distance proportional to the value "0.9" that is the level of the corresponding compensation recording symbol Sr.

In this case, the level of the analog reproduction signal Seq corresponding to the single edge is "0.9" if there is no inter-symbol interference. However, there is actually an inter-symbol interference from other pit existing before or after this pit (the inter-symbol interference is "0.1" in the above-described case). Therefore, it is superimposed on the optical disk DK at the time of the actual reproduction of the information by the information reproducing apparatus P. As a result, the level of the analog reproduction signal Seq becomes the same as the level "+1" of the corresponding original recording symbol Se. Thus, the analog reproduction signal Seq accurately corresponding to the original recording symbol Se can be obtained.

Detailed configurations of the above-described waveform equalization circuit 105 and the digital filter 3 will be explained next with reference to FIG. 5 and FIG. 6 respectively.

At first, there will be explained the MTF characteristics in the optical system of the information reproducing apparatus P.

MTF characteristics F (f) are generally given by the following expression.

$$F(f) = \begin{cases} \frac{1}{\pi} \cdot (\gamma - \sin\gamma) & : f \leq fc \\ 0 & : f > fc \end{cases}$$

$f$: FREQUENCY [Hz]

$$\gamma = 2\cos^{-1}\frac{f}{fc}$$

$$fc = \frac{2NA}{\lambda}vl$$

where fc represents a cutoff frequency (Hz) at which F (f) becomes "0", λ represents a wavelength (m) of an optical beam for reproduction emitted from the reproduction head 106, NA represents a numerical aperture of an objective lens in the reproduction head 106, and vl represents a linear velocity (m/s) of the optical disk DK at the time of reproduction.

A detailed configuration of the waveform equalization circuit 105 will be explained next with reference to FIG. 5.

As shown in FIG. 5, the waveform equalization circuit 105 is structured by five-tap filters, for example. More specifically, the waveform equalization circuit 105 includes delay circuits 121 to 124 for carrying out a delay operation respectively based on a clock signal Sclk having a pre-set clock frequency fclk (Hz), coefficient circuits 126 to 129 each having a tap coefficient shown in bracket in FIG. 5, and an adder circuit 130.

Frequency characteristics G (f) of the waveform equalization circuit 105 are given by the following expression.

$$G(f) = 1 + 2k\cos\frac{2\pi f}{fclk} - 2k\cos\frac{4\pi f}{fclk}$$

where f represents a frequency (Hz) and k represents each tap coefficient.

A detailed configuration of the digital filter 3 will be explained next with reference to FIG. 6.

As shown in FIG. 6, the digital filter 3 is structured as an FIR filter. More specifically, the digital filter 3 includes delay circuits 31 to 34 for carrying out a delay operation respectively based on a clock signal Sclk having the above-described clock frequency fclk, coefficient circuits 35 to 40 each having a tap coefficient shown in brackets in FIG. 6, and an adder circuit 41.

Each tap coefficient Cn showing the filter characteristics (frequency characteristics) of the digital filter 3 is calculated by inverse discrete Fourier transforming the frequency transfer characteristics of the information reproducing apparatus P based on the following expression by using the above-described MTF characteristics F (f) and the frequency characteristics G (f) of the waveform equalization circuit 105.

$$Cn = \frac{1}{N}\sum_{i=0}^{N-1} H(i)W^{-in}$$

$$W = \exp\left(-j\frac{2\pi}{N}\right)$$

$H(i)=F(i\ fo)\cdot G(i\ fo)$ $fo=fclk/N$

N: THE NUMBER OF SAMPLES IN INVERSE DISCRETE FOURIER TRANSFORMING

J: IMAGINARY UNIT

In this case, each tap coefficient of the digital filter 3 takes a value as shown in Table 2 when it is assumed that the number of taps of the digital filter is 15, that the wavelength $\lambda$ of the optical beam for reproduction is $635\times10^9$ m, that the numerical aperture NA of the objective lens of the reproduction head 106 is 0.6, that the linear velocity vl of the optical disk DK at the reproduction time is 3.5m/s, that the tap coefficient k in the waveform equalization circuit 105 is 0.25, that the clock frequency fclk is $18\times10^6$ Hz, and that the number of samples N of the inverse discrete Fourier transformation is 8,192.

TABLE 2

| THE NUMBER OF TAPS | VALUE |
| --- | --- |
| C1 | .00346 |
| C2 | .00234 |
| C3 | .00837 |
| C4 | .00084 |
| C5 | −.02634 |
| C6 | .04079 |
| C7 | .25404 |
| C8 | .98670 |
| C9 | .25404 |
| C10 | .04079 |
| C11 | −.02634 |
| C12 | .00084 |
| C13 | .00837 |
| C14 | .00234 |
| C15 | .00346 |

In this case, when input data series $\{Sm(n)\}$ are input to the digital filter 3 of 15 taps having coefficients $C_1$ to $C_{15}$, output data series $\{Sf(n)\}$ are obtained. An input and output relationship in this case is given by the following expression.

$$Sf(n) = \sum_{i=1}^{15} Ci\, Sm(n+1-i)$$

In a case that the output data Sf(n) is "0" when an input data Sm(n−7) of the center tap of the digital filter 3 is "0", for example, this output data Sf(n) does not include an inter-symbol interference.

However, depending on the values of the input data series $\{Sm(n)\}$, there is a case where the output data Sf(n) does not become "0". In this case, as the corresponding digital filter 3 approximates the frequency transfer characteristics of the recording apparatus RR and the reproducing apparatus P' of the virtual system SS, this output data Sf(n), that is, the duplicate data Sf, shows the level of the analog reproduction signal including the predicted inter-symbol interference.

As explained above, according to the operation of the information recording apparatus R1 and the information reproducing apparatus P of the first embodiment of the present invention, the interference data Sd is generated for showing an inter-symbol interference that is assumed to be superimposed by taking into account the recording characteristics and the reproduction characteristics, and the data is recorded after subtracting this interference data in advance from the recording symbol Se. Therefore, even when the inter-symbol interference is superimposed at the time of reproducing the recording data Srd, the recording data Srd can be reproduced accurately by canceling this influence.

Further, as the recording data Srd is recorded by forming each pit PT on the optical disk DK while changing the edge position of each pit in the peripheral direction thereof in proportion to the value of the compensation recording symbol Sr, the recording data Srd can be reproduced accurately in a simple structure.

Further, the duplicate data Sf is generated based on the recording characteristics, the reproduction characteristics and the recording data Srd, and the decision data Sj is generated based on the duplicate data Sf. As the interference data Sd is generated by using these data, it is possible to generate the interference data Sd closer to the inter-symbol interference actually superimposed in the recording process and the reproduction process. Therefore, the recording data Srd can be reproduced by more effectively canceling the corresponding inter-symbol interference.

Furthermore, when the recording characteristics and the reproduction characteristics have linearity respectively, the duplicate data Sf is generated by using the digital filter 3 for simulating the corresponding recording characteristics and the corresponding reproduction characteristics. Therefore, in the case where the recording characteristics and the reproduction characteristics have linearity, it is possible to generate the duplicate data Sf in a simple structure without using an exclusive CPU or digital signal processor (DSP) or the like.

A second preferred embodiment of the present invention will be described next with reference to FIG. 7.

Figure 7:
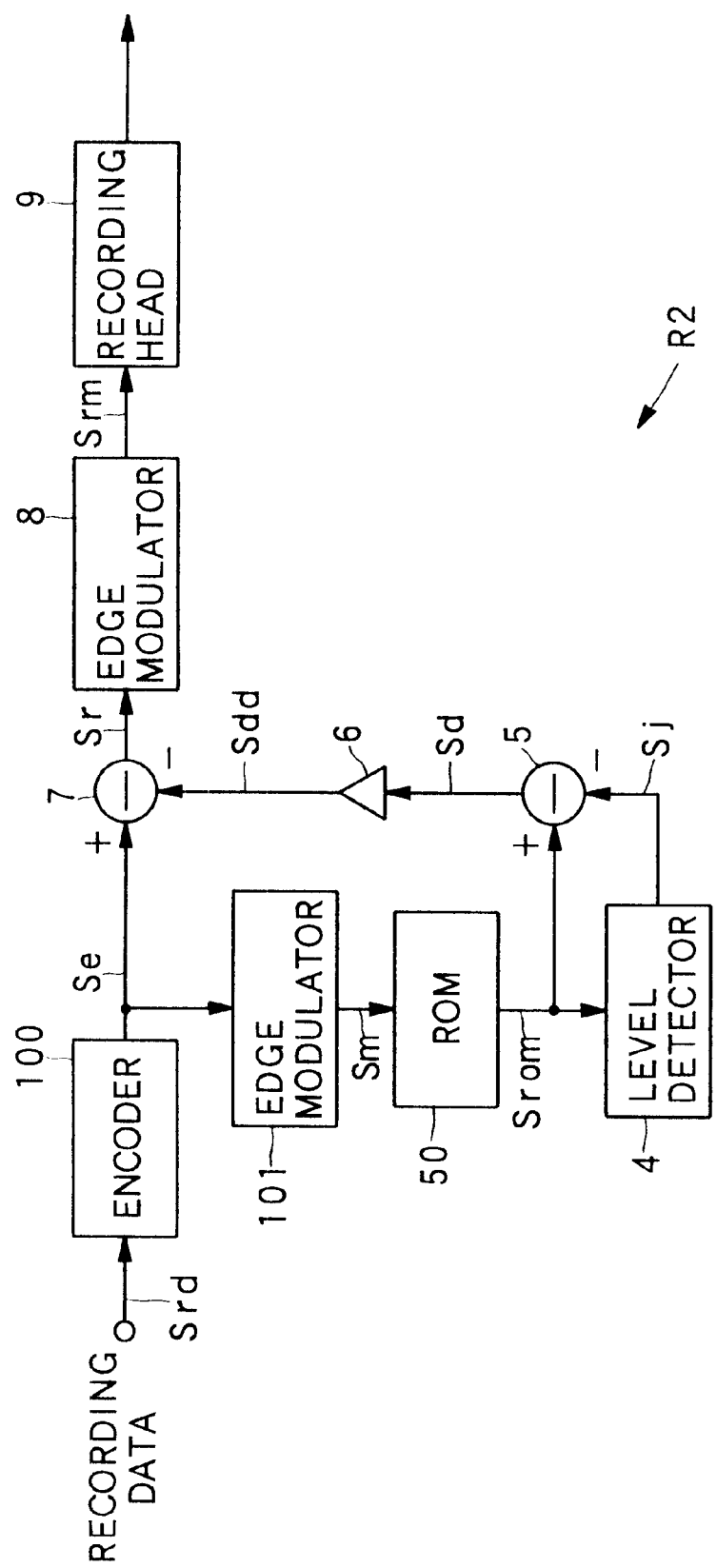
FIG. 7 is a block diagram for showing a second information recording apparatus according to an embodiment of the present invention.

FIG. 7 is a block diagram for showing a schematic configuration of an information recording apparatus R2 relating to a second embodiment. The like configuration members as in the information recording apparatus R1 of the first embodiment shown in FIG. 2 will be attached with identical reference numbers, of which detailed explanation will be omitted.

In the second embodiment, the configuration and the operation of the optical disk and the information reproducing apparatus are similar to those of the optical disk DK and the information reproducing apparatus P of the first embodiment respectively, and their detailed explanation will be omitted.

As shown in FIG. 7, in the second embodiment, in the case where the recording characteristics of an information recording apparatus R2 or the reproduction characteristics of the information reproducing apparatus have nonlinear characteristics unlike the first embodiment, in place of the digital filter 3, there is provided a read only memory (ROM) 50 as memory means for storing in advance duplicate data Srom, corresponding to the duplicate data Sf in the first embodiment, that is a duplication of an analog reproduction signal output from the waveform equalization circuit 105' (FIG. 3B).

Further, in this apparatus R2, the edge modulation signal Sm is input as an address assignment signal of the ROM 50 and the corresponding duplicate data Srom is output to the level detector 4 and the subtraction circuit 5.

The duplicate data Srom can be generated by carrying out an experiment of actually recording and reproducing the recording data Srd onto and from the optical disk DK, for example.

The configuration of the information recording apparatus R2 other than the above-described ROM 50 is similar to that of the information recording apparatus R1 of the first embodiment, and their detailed explanation will be omitted.

As explained above, according to the operation of the information recording apparatus R2 of the second embodiment, the interference data Sd is generated for showing an inter-symbol interference that is assumed to be superimposed by taking into account the recording characteristics and the reproduction characteristics, and the data is recorded after subtracting this interference data in advance from the recording symbol Se. Therefore, even if the inter-symbol interference is superimposed at the time of reproducing the recording data Srd, the recording data Srd can be reproduced accurately by canceling this influence.

Further, as the recording data Srd is recorded by forming each pit PT on the optical disk DK while changing the edge position of each pit in the peripheral direction thereof in proportion to the value of the compensation recording symbol Srm, the recording data Srd can be reproduced accurately in a simple structure.

Further, the duplicate data Srom is generated based on the recording characteristics, the reproduction characteristics and the recording data Srd, and the decision data Sj is generated based on the duplicate data Srom. As the interference data Sd is generated by using these data, it is possible to generate the interference data Sd closer to the inter-symbol interference actually superimposed in the recording process and the reproduction process. Therefore, the recording data Srd can be reproduced by more effectively canceling the corresponding inter-symbol interference.

Furthermore, when the recording characteristics and the reproduction characteristics have nonlinearity respectively, the duplicate data Srom is generated by using the ROM 50 for simulating the corresponding recording characteristics and the corresponding reproduction characteristics. Therefore, in the case where the recording characteristics and the reproduction characteristics have nonlinearity, it is possible to generate the duplicate data Srom in a simple structure without using an exclusive CPU or DSP or the like.

A third preferred embodiment of the present invention will be described next with reference to FIG. 8.

Figure 8:
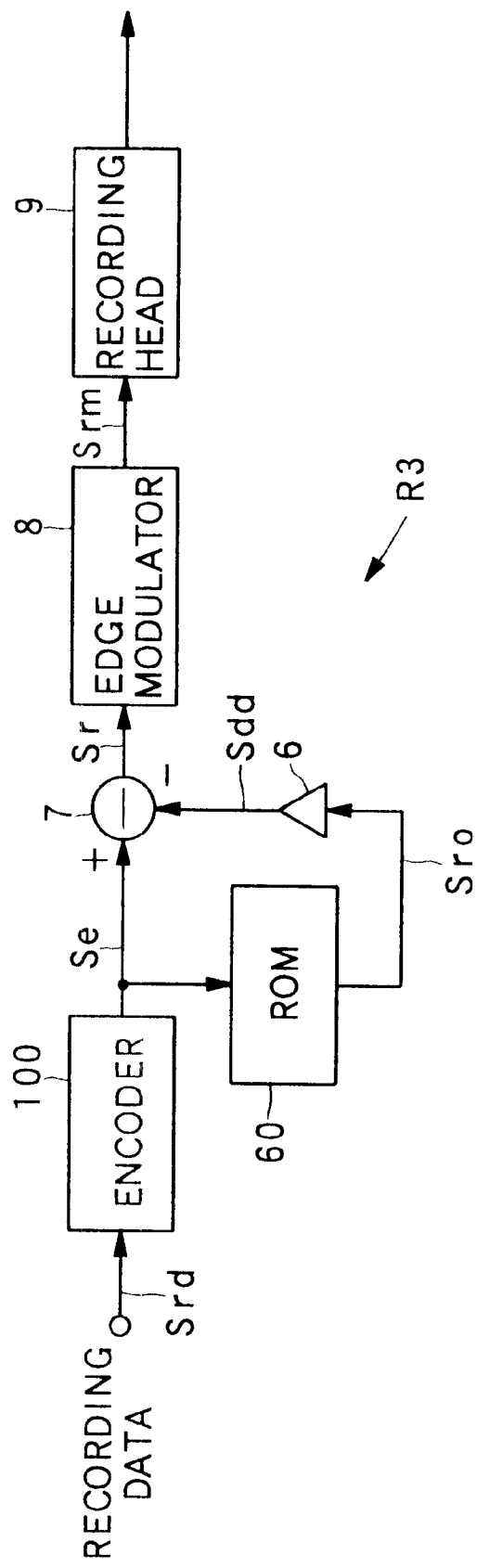
FIG. 8 is a block diagram for showing a third information recording apparatus according to an embodiment of the present invention.

FIG. 8 is a block diagram for showing a schematic configuration of an information recording apparatus R3 relating to a third embodiment. The like configuration members as in the information recording apparatus R1 of the first embodiment shown in FIG. 2 will be attached with identical reference numbers, of which detailed explanation will be omitted.

In the third embodiment, the configuration and the operation of the optical disk and the information reproducing apparatus are similar to those of the optical disk DK and the information reproducing apparatus P of the first embodiment respectively, and their detailed explanation will be omitted.

As shown in FIG. 8, in the third embodiment, in the case where the recording characteristics of an information recording apparatus R3 or the reproduction characteristics of the information reproducing apparatus have nonlinear characteristics unlike the first embodiment, a relationship between the original recording symbol Se and the inter-symbol interference to be mixed into this is obtained in advance by carrying out an experiment of actually recording and reproducing the recording data Srd onto and from the optical disk DK. Further, in place of the edge modulator 101, the digital filter 3, the level detector 4 and the subtraction circuit 5, there is provided a ROM 60 as memory means for pre-storing an interference data Sro for showing the level of an inter-symbol interference obtained for each of the series of the recording symbol Se.

Further, a series of the corresponding recording symbol Se is input as an address assignment signal of the ROM 60 and the series of the corresponding interference data Sro is output to the coefficient circuit 6.

The configuration of the information recording apparatus R3 other than the above-described ROM 60 is similar to that of the information recording apparatus R1 of the first embodiment, and their detailed explanation will be omitted.

From the information recording apparatus R3 of the third embodiment, it is possible to obtain the effects similar to those obtained from the information recording apparatus R2 of the second embodiment.

Figure 9A:
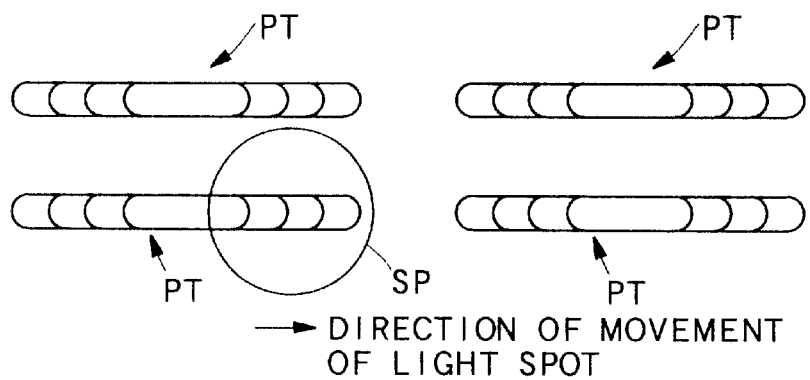
FIGS. 9A to 9C are diagrams for showing pits recorded according to the SCIPER system.

In each of the above-described embodiments, description has been made of the case where one edge takes three-value levels and the reproduction laser beam reads only one edge of one pit. However, the present invention is not limited to the above arrangement, and the invention can also be similarly applied to a case where each edge holds a recording symbol of four-value levels as shown in FIG. 9A.

Figure 9B:
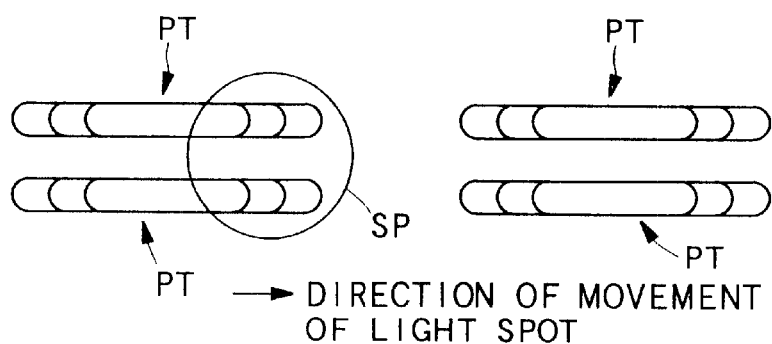

Further, the invention can also be similarly applied to a case where two edges are read simultaneously as shown in FIG. 9B.

Figure 9C:
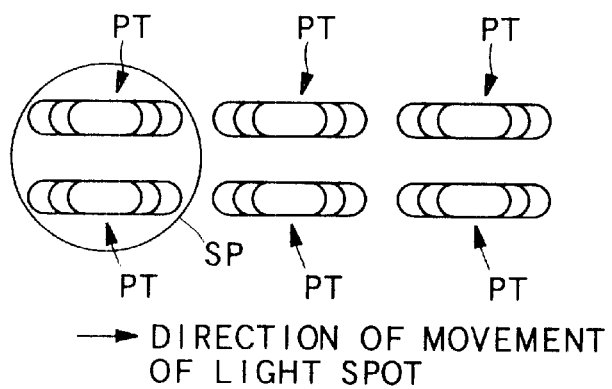

Further, the invention can also be similarly applied to a case where four edges are read simultaneously as shown in FIG. 9C.

In the case of simultaneously reading edges of pits on two tracks, the duplicate data Sf, Srom or the interference data Sd may be generated based on the pit string recorded on one track or based on pit strings of the two tracks. In the latter case, there may be provided a first-in and first-out (FIFO) memory for storing the edge modulation signal Sm for one track in the input stage of the digital filter 3.

Furthermore, in each of the above-described embodiments, description has been made of the case where the reproduction symbol Spj is generated by comparing the level of the analog reproduction signal Seq with predetermined threshold values in the level detector 104. However, the present invention can also be similarly applied to the case where the reproduction symbol Spj is generated by using what is called a Viterbi decoding circuit in place of the level detector 104.

Moreover, the present invention can also be applied to any one of optical disk systems including the ROM disk, the phase change disk and the magnetic-optical disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-155067 filed on Jun. 3, 1998 including the specification, claims, drawings and summary is incorporated herein by reference in its entirety.

What is claimed is:

1. A method of recording a digital signal representing digital data on to a recording medium by changing a position of each edge of each of a plurality of pits in accordance with the digital signal, the method being used in a recording and reproducing system comprising a recording apparatus for recording the digital signal onto the recording medium by changing the position of each edge of each of the plurality of pits in accordance with the digital signal, and a reproducing apparatus for reproducing the digital signal recorded on the recording medium from the recording medium, the method comprising the processes of:

receiving the digital signal to be recorded;

generating a predicted inter-symbol interference signal by predicting inter-symbol interference contained in a reproduced signal from the recording medium when a reproducing process is carried out with respect to the recording medium by the reproducing apparatus, on the basis of predetermined characteristics of a recording process in the recording apparatus, predetermined characteristics of the reproducing process, and the received digital signal;

generating a compensated digital signal by subtracting the predicted inter-symbol interference signal from the received digital signal; and recording the compensated digital signal onto the recording medium by continuously changing the position of each edge of each of the plurality of pits in proportion to the compensated digital signal.

2. The method according to claim 1, wherein the process of generating the predicted inter-symbol interference signal comprises the processes of:

predicting the reproduced signal containing the inter-symbol interference on the basis of a predetermined frequency transfer function of the recording process, a predetermined frequency transfer function of the reproducing process, and the received digital signal; and generating a detected signal not containing the inter-symbol interference, by detecting a level of the reproduced signal; and generating the predicted inter-symbol interference signal by subtracting the detected signal from the reproduced signal.

3. A recording apparatus for recording a digital signal representing digital data onto a recording medium by changing a position of each edge of each of a plurality of pits in accordance with the digital signal, the recording apparatus being used in a recording and reproducing system together with a reproducing apparatus for reproducing the digital signal recorded on the recording medium from the recording medium, the recording apparatus comprising:

a receiving device for receiving the digital signal to be recorded;

a predicting device for generating a predicted inter-symbol interference signal by predicting inter-symbol interference contained in a reproduced signal from the recording medium when a reproducing process is carried out with respect to the recording medium by the reproducing apparatus, on the basis of predetermined characteristics of a recording process in the recording apparatus, predetermined characteristics of the reproducing process, and the received digital signal;

a compensating device for generating a compensated digital signal by subtracting the predicted inter-symbol interference signal from the received digital signal; and a recording device for recording the compensated digital signal onto the recording medium by continuously changing the position of each edge of each of the plurality of pits in proportion to the compensated digital signal.

4. The recording apparatus according to claim 3, wherein the predicting device comprises:

a replicating device for predicting the reproduced signal containing the inter-symbol interference on the basis of a predetermined frequency transfer function of the recording process, a predetermined frequency transfer function of the reproducing process, and the received digital signal; and a detecting device for generating a detected signal not containing the inter-symbol interference, by detecting a level of the reproduced signal; and a subtracting device for generating the predicted inter-symbol interference signal by subtracting the detected signal from the reproduced signal.

5. The recording apparatus according to claim 3, wherein the predicting device comprises a finite impulse response digital filter.

6. The recording apparatus according to claim 3, wherein the predicting device comprises a memory device for storing data representing the predicted inter-symbol interference signal.

7. The recording apparatus according to claim 4, wherein the replicating device comprises a memory device for storing data representing the reproduced signal containing the inter-symbol interference.

8. A recording disk which has a plurality of pits corresponding to a digital signal, wherein a position of each edge of each of the plurality of pits is continuously changed in accordance with the digital signal, wherein each of the plurality of pits is formed by a recording method, the recording method comprising the steps of:

receiving the digital signal to be recorded;

generating a predicted inter-symbol interference signal by predicting inter-symbol interference contained in a reproduced signal from the recording disk when a reproducing process is carried out with respect to the recording disk by the reproducing apparatus, on the basis of predetermined characteristics of a recording process in the recording apparatus, predetermined characteristics of the reproducing process, and the received digital signal;

generating a compensated digital signal by subtracting the predicted inter-symbol interference signal from the received signal; and recording the compensated digital signal onto the recording disk by continuously changing the position of each edge of each of the plurality of pits in proportion to the compensated digital signal.

9. The recording disk according to claim 8, wherein the process of generating the predicted inter-symbol interference signal comprises the processes of:

predicting the reproduced signal containing the inter-symbol interference on the basis of a predetermined frequency transfer function of the recording process, a predetermined frequency transfer function of the reproducing process, and the received digital signal; and generating a detected signal not containing the inter-symbol interference, by detecting a level of the reproduced signal; and generating the predicted inter-symbol interference signal by subtracting the detected signal from the reproduced signal.

* * * * *